United States Patent
Fisher et al.

(10) Patent No.: US 10,259,988 B2
(45) Date of Patent: Apr. 16, 2019

(54) POLYMER HYDRATION SYSTEM AND METHOD

(71) Applicant: Halliburton Energy Services, Inc., Houston, TX (US)

(72) Inventors: Chad A. Fisher, Cache, OK (US); Bryan Chapman Lucas, Duncan, OK (US); Calvin L. Stegemoeller, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/759,475

(22) PCT Filed: Nov. 3, 2015

(86) PCT No.: PCT/US2015/058808
§ 371 (c)(1),
(2) Date: Mar. 12, 2018

(87) PCT Pub. No.: WO2017/078685
PCT Pub. Date: May 11, 2017

(65) Prior Publication Data
US 2018/0251670 A1    Sep. 6, 2018

(51) Int. Cl.
| | | |
|---|---|---|
| *E21B 43/26* | (2006.01) | |
| *C09K 8/68* | (2006.01) | |
| *E21B 21/06* | (2006.01) | |
| *C09K 8/70* | (2006.01) | |
| *E21B 43/04* | (2006.01) | |
| *E21B 43/267* | (2006.01) | |

(52) U.S. Cl.
CPC .................. *C09K 8/68* (2013.01); *C09K 8/70* (2013.01); *E21B 21/062* (2013.01); *E21B 43/04* (2013.01); *E21B 43/26* (2013.01); *E21B 43/267* (2013.01)

(58) Field of Classification Search
CPC ........... C09K 8/68; C09K 8/70; E21B 21/062; E21B 43/04; E21B 43/267; E21B 43/26
USPC ....................................................... 166/305.1
See application file for complete search history.

(56) References Cited

U.S. PATENT DOCUMENTS

| | | |
|---|---|---|
| 5,046,856 A | 9/1991 | McIntire |
| 7,229,207 B2 | 6/2007 | Graham, Sr. |
| | (Continued) | |

OTHER PUBLICATIONS

International Search Report and Written Opinion issued in corresponding PCT Application No. PCT/US2015/058808 dated Aug. 16, 2016.

*Primary Examiner* — Silvana C Runyan
(74) *Attorney, Agent, or Firm* — McAfee & Taft

(57) ABSTRACT

A system and method for hydrating a hydratable material are provided in which a first hydration fluid is heated prior to mixing with the hydratable material to produce a hydration mixture. The hydration mixture is subsequently mixed with a second hydration fluid to produce a well injection fluid having a hydrated hydratable material. Generally, the first hydration fluid will be at about ambient temperature before it is heated and the second hydration fluid will be at about at about ambient temperature when it is mixed with the hydration mixture. Typically, the first hydration fluid will be a minor part of the hydration fluid content of the well injection fluid and the second hydration fluid will be a major part of the hydration fluid content of the well injection fluid.

10 Claims, 5 Drawing Sheets

(56) References Cited

U.S. PATENT DOCUMENTS

| | | | |
|---|---|---|---|
| 7,888,294 B2 | 2/2011 | Weinstein et al. | |
| 8,393,390 B2 | 3/2013 | Gupta et al. | |
| 8,641,266 B2 | 2/2014 | McIntire | |
| 8,899,823 B2 * | 12/2014 | Oldham | C09K 8/62 366/136 |
| 2005/0067336 A1 | 3/2005 | Graham, Sr. | |
| 2006/0146643 A1 | 7/2006 | Allen | |
| 2008/0242747 A1 * | 10/2008 | Lucas | B01J 13/0052 516/99 |
| 2010/0069270 A1 | 3/2010 | Weinstein et al. | |
| 2012/0149606 A1 | 6/2012 | Abad et al. | |
| 2014/0364344 A1 | 12/2014 | Weinstein et al. | |
| 2015/0090437 A1 | 4/2015 | Lundstedt et al. | |

* cited by examiner

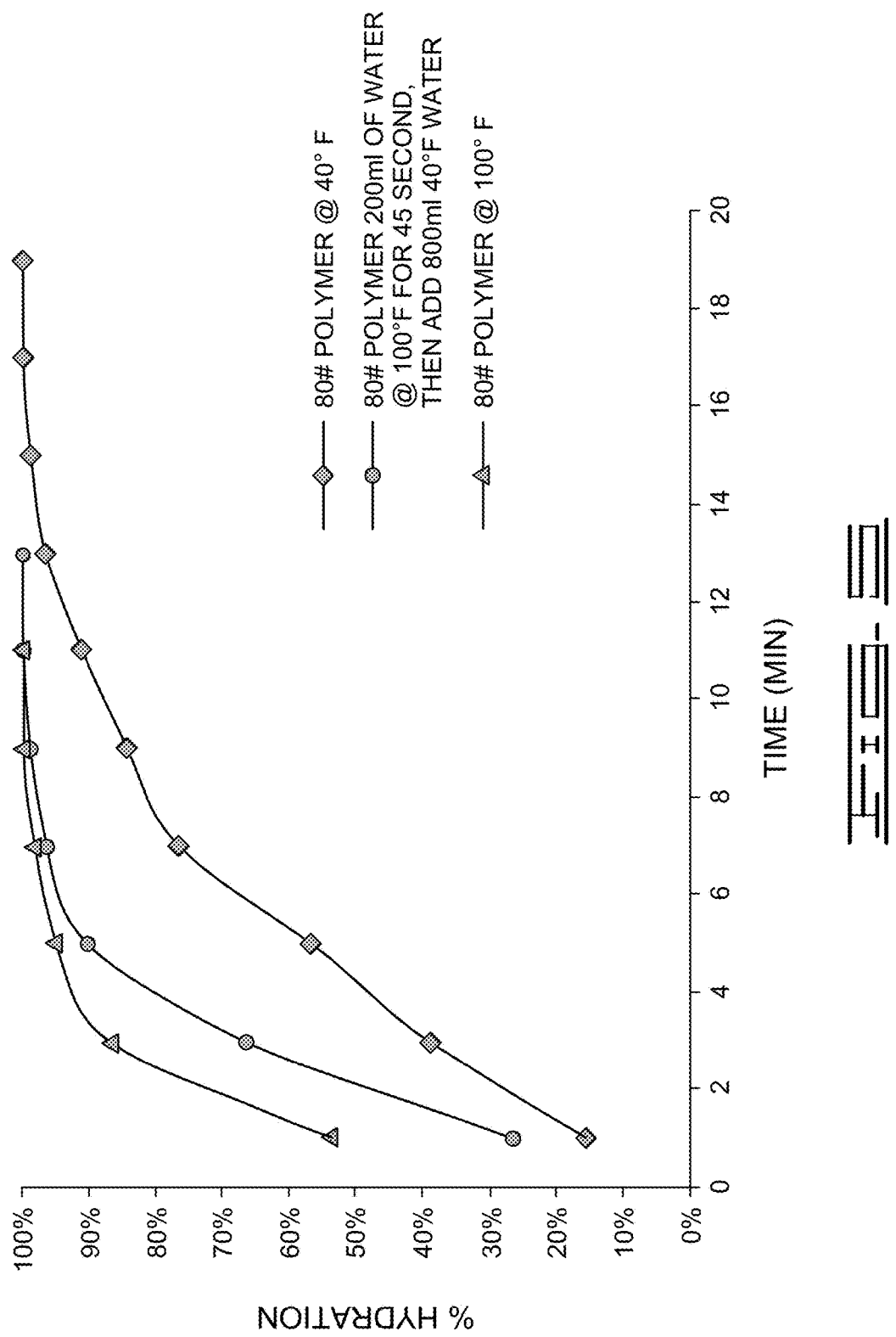

POLYMER HYDRATION SYSTEM AND METHOD

FIELD

The present disclosure relates generally to fluid hydration, including the hydration of fracturing fluids.

BACKGROUND

In subterranean well treatment operations, high viscosity fluids are often formulated using hydratable materials, typically polymers, which are mixed with water or other aqueous fluids at the job site. The rate of hydration of a polymer is still a critical factor particularly in continuous mix applications wherein the necessary hydration and associated viscosity rise must take place over a relatively short time span corresponding to the residence time of the fluid during the continuous mix procedure. Hydration is a process by which a hydratable polymer chemically combines with water to create a viscous gel.

BRIEF DESCRIPTION OF THE DRAWINGS

FIG. 5 is a chart illustrating hydration versus time for different hydration systems.

DETAILED DESCRIPTION

Figure 1:
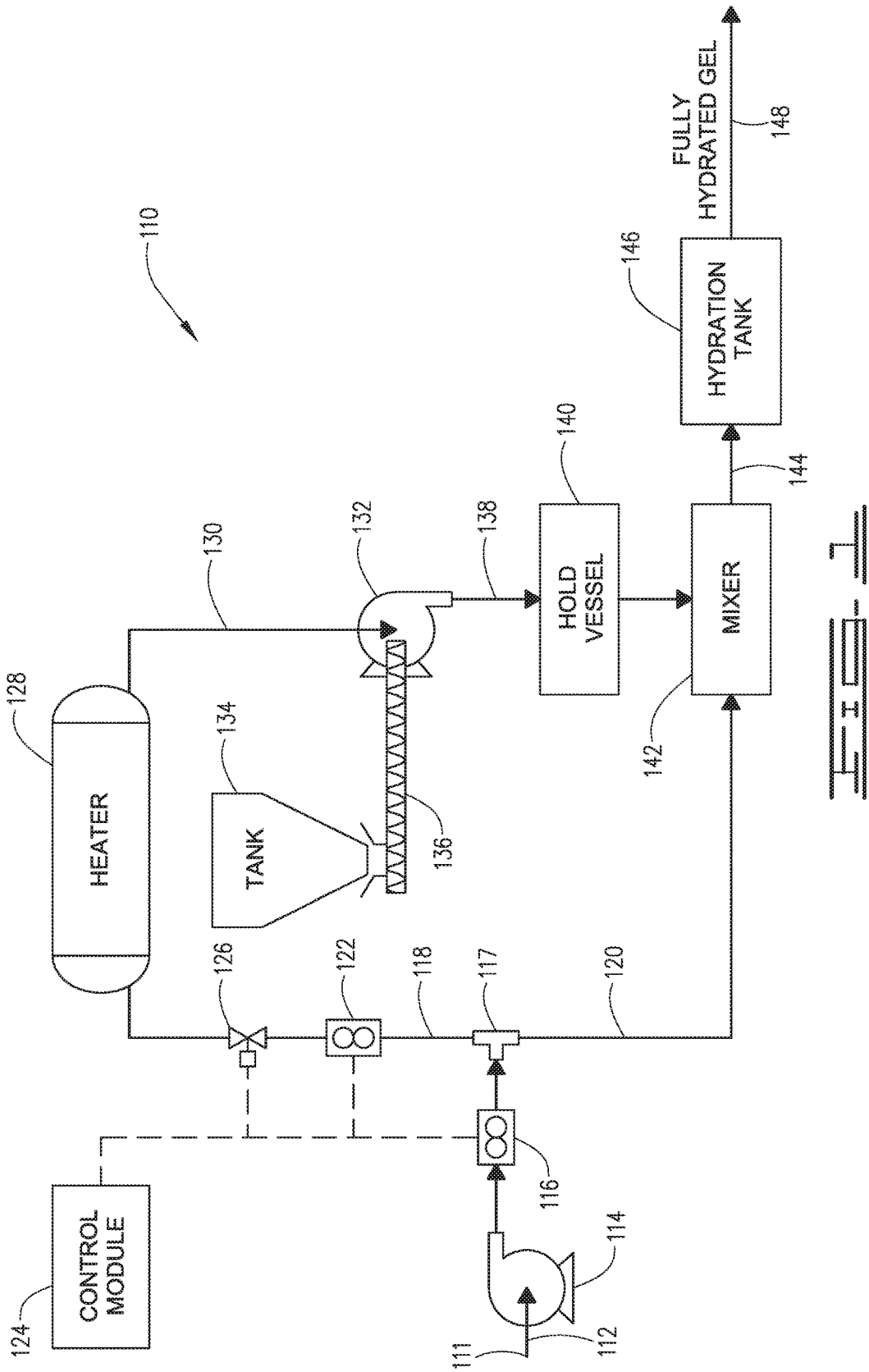
FIG. 1 is a schematic illustration of a system for carrying out hydration in accordance with certain embodiments of the present disclosure.

In the description that follows, the drawings are not necessarily to scale and the proportions of certain parts have been exaggerated to better illustrate details and features of the invention. In the following description, the terms "upper," "upward," "lower," "below," "downhole" and the like as used herein shall mean in relation to the bottom or furthest extent of the surrounding wellbore even though the wellbore or portions of it may be deviated or horizontal. The terms "inwardly" and "outwardly" are directions toward and away from, respectively, the geometric axis of a referenced object. Where components of relatively well-known design are employed, their structure and operation will not be described in detail.

Various hydratable materials may be used to viscosify treatment fluids, such as fracturing fluids. The hydratable material selected for a particular use may be based on a number of factors, including the rheological properties, economics, and hydration ability of the material. The term "hydration" is used to describe the process wherein the hydratable material solvates or absorbs water (hydrates) and swells in the presence of water. Generally, a hydrating fluid is mixed with the hydratable material. In some instances, the hydratable material is dry gel in a powder form and the hydrating fluid is an aqueous component, such as water or water and other materials.

In cold climates or weather, the use of ambient temperature hydrating fluids can result in poor hydration and can waste polymers as gels are overloaded due to poor polymer performance. Heating may be used to increase the yield of a hydratable material in hydration and increase the rate of hydration of the hydratable material. Additionally, a specified viscosity can be achieved with a lesser amount of hydratable material than would otherwise be used. Prior art processes have relied on heating substantially all the hydrating fluid before mixing with the hydratable compound. However, such heating results in a substantial cost due to the energy requirements of heating large quantities of hydrating fluid.

It has now been discovered that energy requirements can be substantially reduced while still achieving substantially all the advantages of heating all the hydrating fluid required. The advantages are achieved by a process in which only a minor portion of the total required hydrating fluid is heated. In the process, a hydrating fluid is introduced into a hydration system. The hydrating fluid can be introduced as two separate streams or as one stream which is then split into two streams within the hydration system. Whether introduced as one or two streams, the hydrating fluid typically will be introduced into the hydration system at ambient temperature. Generally, it is preferable that the hydrating fluid be introduced into the system without any prior heating so as not to reduce the energy savings.

After introduction and, if necessary, splitting of the hydrating fluid stream, a first stream of hydrating fluid is heated so as to elevate its temperature. Typically, the first stream will be a minor portion of the hydration fluid introduced into the hydration system. After heating, the first stream is mixed with a hydratable material so as to at least partially hydrate the hydratable material and form a concentrated hydration mixture. The mixing of the first stream and the hydratable material is carried out with the first stream still being at the elevated temperature. Next, the concentrated hydration mixture is mixed with the second stream of hydrating fluid, which is still at ambient temperature, to form the well injection mixture. The well injection mixture can be further combined with other additives before being injected into the well. While the above discussion indicates that the hydration fluid is introduced into the hydration system at ambient temperature, it will be understood that the benefits can still be achieved with the hydration fluid introduced at a lower temperature or higher temperature as long as the first stream is heated to a higher temperature than the temperature of the hydration fluid at introduction.

The hydratable material will typically be a hydratable polymer. The hydratable polymers useful in the practice of the invention include natural or synthetic polymers, or a combination thereof. Non-limiting examples of suitable natural polymers include guar, guar derivatives, and the like. Non-limiting examples of suitable guar derivatives include carboxyalkyl guar or a hydroxyalkylated guar, such as carboxymethyl guar (CMG), hydroxypropyl guar (HPG), hydroxyethyl guar (HEG), hydroxybutyl guar (HBG) and carboxymethylhydroxypropyl guar (CMHPG). Still other non-limiting examples of suitable natural polymers include cellulose, karaya, xanthan, tragacanth, gum ghatti, carrageenin, psyllium, and gum acacia. Non-limiting examples of suitable synthetic polymers include hydratable synthetic polymers and copolymers, and include acrylamide polymers, vinyl sulfonates, and the like. For example, hydratable synthetic polymers and copolymers such as polyacrylate, polymethacrylate, acrylamide-acrylate copolymers, and maleic anhydride methylvinyl ether copolymers may be used. By way of further example, an acrylamide polymer may be a polymer or copolymer of acrylamide. Even though these acrylamide polymers are often called "polyacrylamide", many are actually copolymers of acrylamide and one or more other chemical species. The main consequence is to give the "modified" polyacrylamide some ionic character. The polyacrylamide may also be used as a homopolymer. As used herein, the expression "polyacrylamide" is meant to encompass acrylamide homopolymers and copolymers, or any suitable synthetic form of polyacrylamide. As used herein, "homopolymers" are those polymers containing less than about 0.1% by weight of other comonomers. Combinations or mixtures of homopolymers and copolymers may be used as well. The copolymers may include two or more different comonomers and may be random or block copolymers. The comonomers may include, for example, sodium acrylate. The polyacrylamide polymers and copolymers useful for the invention may include those having an average molecular weight of from about 1000, or lower, to about 20 million, or above, with from about 1 million to about 5 million being typical. Any combination of one or more natural and/or synthetic polymers may also be used as the hydratable polymer component. Typically, the amount of hydratable polymer employed can vary widely, but can be preferably in the range of about 10 to about 100, or about 15 to about 50, or about 20 to about 30, pounds per 1,000 gallons of aqueous hydrotreating medium (e.g., water) in the fluid. In at least some aspects of the invention, the amount of aqueous hydrotreating medium is preferably minimized to employ the least amount possible while still achieving the desired level of polymer hydration.

The hydrating fluid is typically comprised of water or one or more hydrating compositions, or a combination thereof. Besides water, suitable hydrating compositions may include, for example, fresh water, brine, seawater, produced water, or the like, as well as any combination of two or more of the foregoing. Although referred to as "hydrating", the incoming fluid need not be water. For example, the hydrating fluid can include a water solution (containing water and one or more other elements or compounds) or another liquid. Accordingly, the hydration fluid may include water or other fluids capable of hydrating the hydratable material. For example, suitable drilling mud may be used as the hydration fluid. "Mud" is a term that is generally synonymous with drilling fluid and that encompasses fluids used in hydrocarbon drilling operations, especially fluids that contain significant amounts of suspended solids, emulsified water, or oil.

The mixture formed from at least the hydratable polymer(s) and the aqueous hydrotreating medium may optionally further include other additives commonly used in combination with hydrated polymer compositions, depending upon the intended use of the mixture. Some examples of other suitable additives which may be employed include foaming agents, cross-linking agents, oxidizing agents, radical initiators, proppants, surfactants, emulsifiers, stabilization additives, buffering agents, complexing agents, gel breakers, biocides, surface tension reducing agents, scale inhibitors, gas hydrate inhibitors, polymer specific enzyme breakers, clay stabilizers, acid or a mixture thereof and other well treatment additives known in the art Turning now to FIG. 1, the current method and system will be further described with respect to a specific embodiment. In FIG. 1, hydration system 110 is illustrated, wherein a hydration-fluid stream 112 is introduced into the hydration system 110 through an inlet 111 by pump 114. Hydration-fluid stream 112 is introduced into hydration system 110 at a first temperature, which will typically be ambient temperature. As discussed above, the first temperature can be higher or lower than ambient temperature. Generally, for the most efficient use of the hydration system 110, the first temperature will be lower than the temperature at which efficient hydration of the hydratable material can be carried out. In most instances, this will be a temperature below 100° F. (about 38° C.), and more typically the first temperature will be below about 75° F. (about 24° C.), or below about 50° F. (about 10° C.), or below about 40° F. (about 4° C.).

As hydration-fluid stream 112 enters hydration system 110, a first flowmeter 116 measures the total flow of hydration fluid into the system. Afterwards, hydration-fluid stream 112 is split into a first fluid stream 118 and a second fluid stream 120 by splitter 117. A second flowmeter 122 measures the total flow of hydration fluid in first fluid stream 118. For efficient use of hydration system 110 it is typically only necessary for a minor portion of the total hydration-fluid stream 112 to be separated off as first fluid stream 118. A control module 124 can be used to adjust a valve 126 based on the measurements from first flowmeter 116 and second flowmeter 122. From the measurements, control module 124 can calculate the percentage of total hydration-fluid stream 112 which is split off as first fluid stream 118 and, if the percentage does not equal a predetermined value, control module 124 can adjust valve 126 in order to change the percentage. Generally, first fluid stream 118 is about 40% or less of hydration-fluid stream 112 by volume. More typically, first fluid stream 118 is about 30% or less of hydration stream 112 by volume, or is about 25% or less or is about 20% of the volume of hydration stream 112. Also, the first fluid stream is typically at least about 1%, at least about 5% or at least about 10% of the hydration-fluid stream 112 by volume. Accordingly, second fluid stream 20 can be about 60% or more of hydration-fluid stream 112 by volume. More typically, second fluid stream 120 can be about 70% or more of hydration stream 112 by volume, or can be about 74% or more or can be about 80% of the volume of hydration stream 112. Also, the second fluid stream can be 99% or less, 95% or less or 90% or less of the hydration-fluid stream 112 by volume.

First fluid stream 118 is introduced into heater 128 where it is heated to an elevated temperature. Generally, the elevated temperature is a temperature at which efficient hydration of the hydratable material occurs based on the amount of hydratable material to be added. The elevated temperature is greater than the first temperature; thus, it is generally greater than ambient or greater than about 50° F. (about 10° C.), or greater than about 75° F. (about 24° C.). More typically, the elevated temperature can be 100° F. (about 38° C.) or greater, or 125° F. (about 52° C.) or greater, or 150° F. (about 66° C.) or greater. Typically, the elevated temperature is greater than the first temperature by at least about 40° F. (about 22° C.), or at least about 50° F. (about 27° C.). In some cases, the elevated temperature is greater than the first temperature by at least about 75° F. (about 42° C.).

A heated first fluid stream 130 from heater 128 is introduced into a mixer 132, where it is combined with hydratable material to produce a flow of hydration mixture (hydration mixture stream 138). Typically, the heated first fluid stream will still be at approximately the temperature described above during mixing in mixer 132. The hydratable material can be stored in a tank 134 and introduced into mixer 132 via feeder 136. It is preferred that the hydratable material be a dry powder in tank 134 so as to achieve the economic advantages of dry powder storage and delivery over the storage and delivery of concentrated hydratable material. While any mixer suitable for mixing a dry-powder hydratable material with a hydration fluid can be used, one suitable mixer is ADP™ Advanced Dry Polymer Blender marketed by Halliburton Energy Services, Inc.

Hydration mixture stream 138 is subsequently mixed with the second fluid stream 120 in a mixing chamber, such as mixer 142. Generally, the mixing with second fluid stream 120 will be delayed so as to provide time to adequately pre-hydrate the hydratable material. The delay time period, or holding time period, for the pre-hydration is relatively short and can be about 5 minutes or less, about 120 seconds or less, or about 60 seconds or less. Typically, the time period will be greater than about 15 seconds, about 30 seconds, or about 40 seconds. Often the time period will be on the order of about 45 seconds.

The holding time period can be accomplished in a run of conduit or a hold vessel 140 can be used. It can be advantageous to heat the run of conduit or use a heated hold vessel 140 in order to ensure that the hydration mixture is maintained at an appropriate elevated temperature during the holding time period. Holding vessel 140 is operable to retain a portion of the flow of hydration mixture stream 138 for a predetermined period of time to prompt hydration of the hydratable material in hydration mixture stream 138. In some embodiments, a hydration tank can be used as hold vessel 140.

After holding vessel 140, the hydration mixture is mixed with second fluid stream 120 in the mixing chamber, such as the mixer 142, the resulting well injection mixture 144 can exit the system through outlet 148 and is suitable for being introduced into a downhole process, such as the fracturing process described below. However, the well injection mixture can first be introduced into a hydration tank 146, as is known in the art, to provide further hydration time. Hydration tank 146 is operable to retain a portion of the flow of the well injection mixture for a pre-determined period of time to further prompt hydration of the hydratable material in the portion of the flow of well injection mixture.

Figure 2:
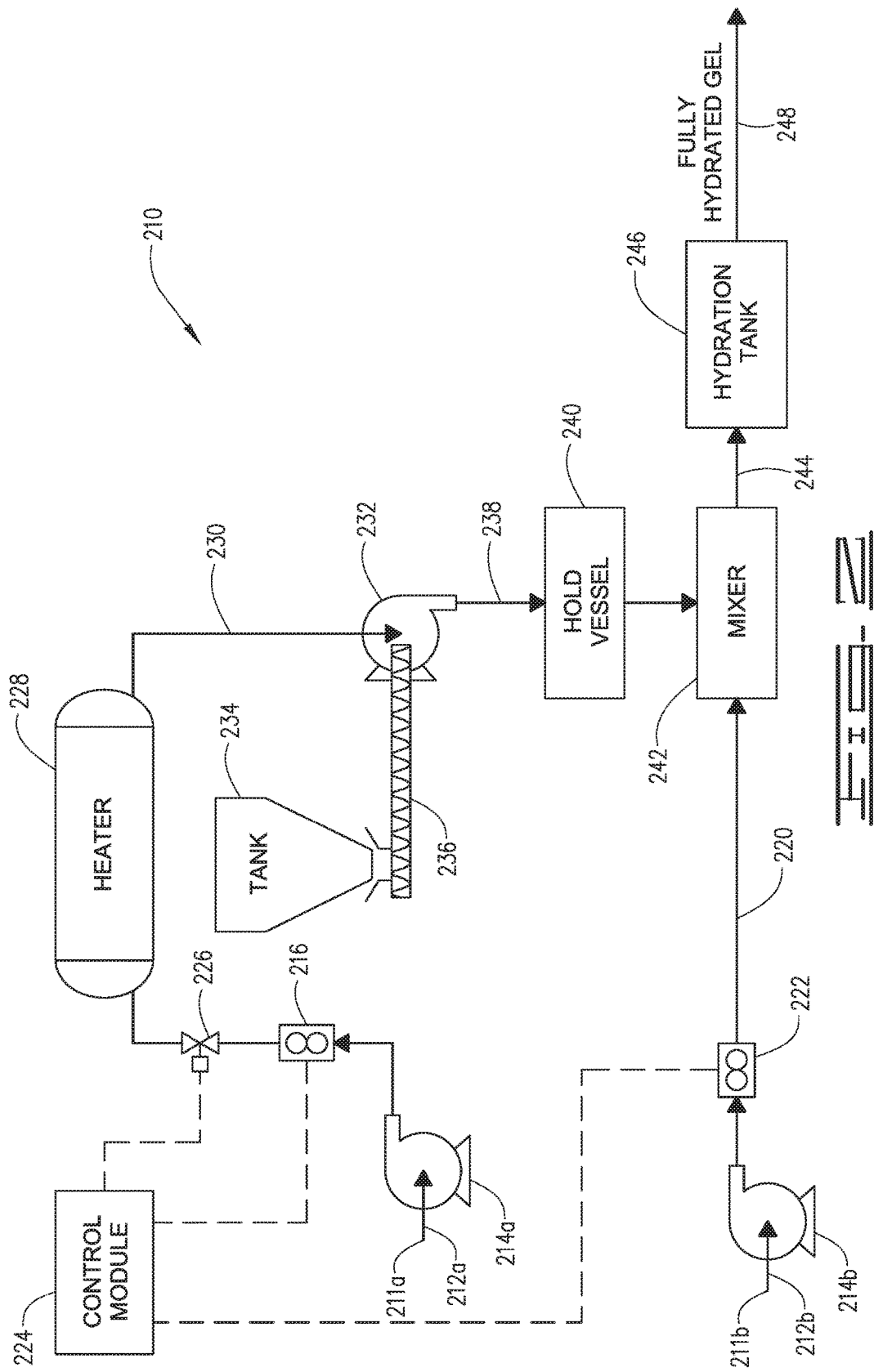
FIG. 2 is a schematic illustration of a system for carrying out hydration in accordance with other embodiments of the present disclosure.

The above embodiment utilizes a single hydration-fluid stream 112, which is introduced into hydration system 110; however, it is within the scope of the invention to use multiple hydration-fluid streams. For example, FIG. 2 illustrates a hydration system 210 wherein two hydration-fluid streams 212a, 212b are introduced into the hydration system 210.

A first hydration-fluid stream 212a is introduced into the hydration system 210 through a first inlet 211a by a first pump 214a. As first hydration-fluid stream 212a enters hydration system 210, a first flowmeter 216 measures the total flow of first hydration fluid into hydration system 210. A second hydration-fluid stream 212b is introduced into the hydration system 210 through a second inlet 211b by a second pump 214b. As second hydration-fluid stream 212b enters hydration system 210, a second flowmeter 222 measures the total flow of second hydration fluid into hydration system 210. Both first hydration-fluid stream 212a and second hydration-fluid stream 212b are introduced into hydration system 10 at a first temperature, which will typically be ambient temperature. As discussed above in relation to FIG. 1, the first temperature can be higher or lower than ambient temperature. Additionally, the temperatures of first hydration-fluid stream 212a and second hydration-fluid stream 212b can be different at introduction but generally will be as described for hydration-fluid stream 112 of FIG. 1.

A control module 224 can be used to adjust a valve 226 based on the measurements from first flowmeter 216 and second flowmeter 222. From the measurements, control module 224 can calculate the percentage of first hydration-fluid stream 212a based on the total hydration-fluid stream (both first hydration-fluid stream 212a and second hydration-fluid stream 212b). Alternatively or additionally, control module 224 can calculate the percentage of second hydration-fluid stream 212b based on the total hydration-fluid stream. If the percentage calculated does not equal a predetermined value, control module 224 can adjust valve 226 in order to adjust the amount of first hydration fluid entering hydration system 210 as first hydration-fluid stream 212a and thus change the percentage.

Similar to hydration system 110, first hydration-fluid stream 212a from valve 226 is introduced to a heater 228 and then the heated first hydration-fluid stream 230 is introduced into a mixer 232, which receives hydrate material from a tank 234 via a feeder 236. Subsequently, hydration mixture stream 238 from mixer 232 can be introduced into a holding vessel 240 prior to being mixed in a mixing chamber, such as mixer 242 with second hydration-fluid stream 212b to form a well injection mixture 244, which can be used as is or introduced into hydration tank 246 prior to use. Well injection mixture 248 exits hydration system 210 through outlet 248.

Figure 3:
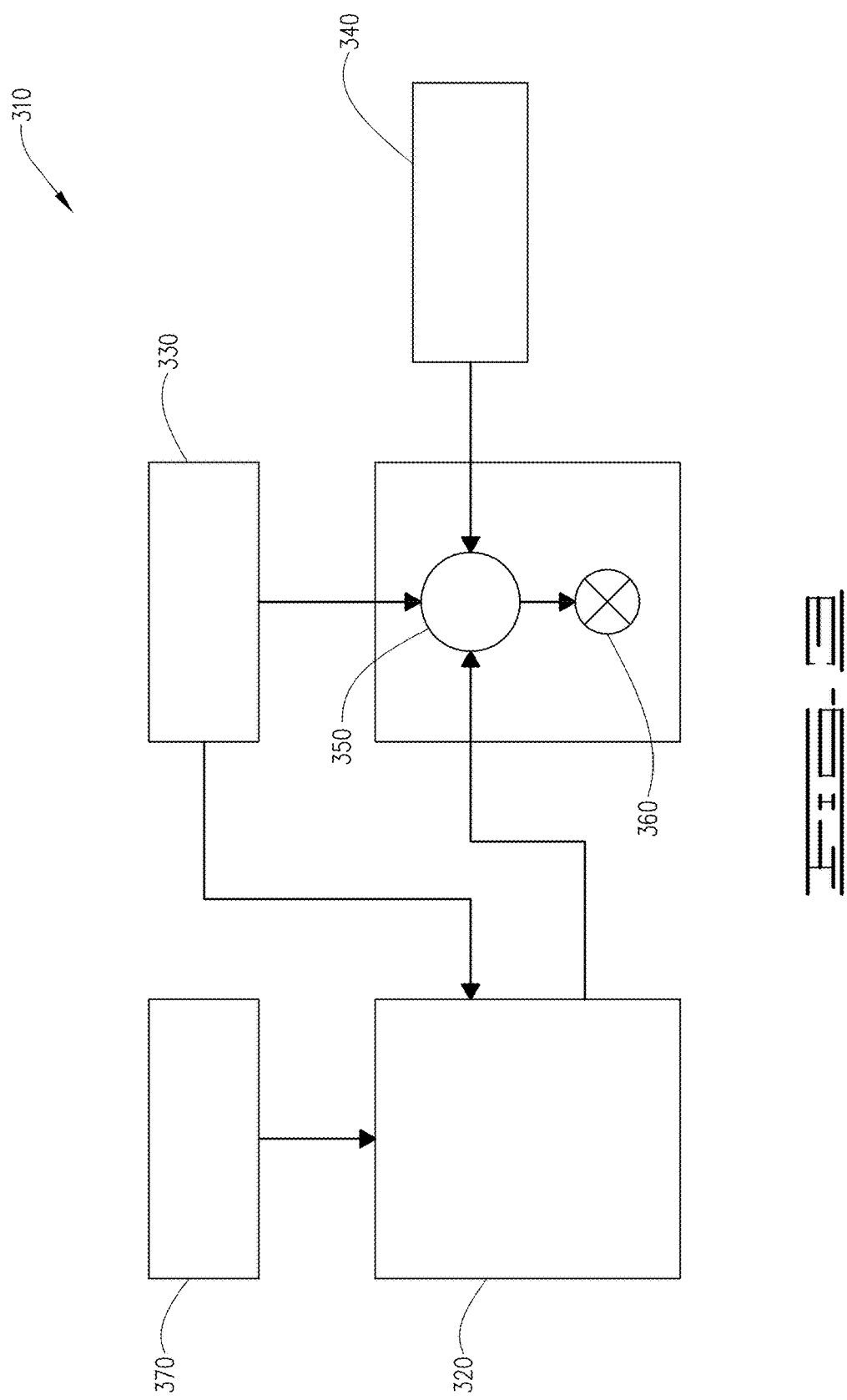
FIG. 3 is a diagram illustrating an example of a fracturing system that may be used in accordance with certain embodiments of the present disclosure.

The well injection mixture resulting from the above described process and system may be used as a well treatment fluid for a variety of downhole processes, such as fracturing operations, gravel packing, etc. In such operations, the exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 3, the disclosed methods and compositions may directly or indirectly affect one or more components or pieces of equipment associated with an exemplary fracturing system 310, according to one or more embodiments. In certain instances, the system 310 includes a fracturing fluid producing apparatus 320 (typically including a hydration system in accordance with the above description), a fluid source 330, a proppant source 340, and a pump and blender system 350, and resides at the surface at a well site where a well 360 is located. In certain instances, the fracturing fluid producing apparatus 320 combines a hydratable material and a hydrating fluid from source 330 to produce a hydrated fracturing fluid that is used to fracture the formation. The hydrated fracturing fluid can be a fluid for ready use in a fracture stimulation treatment of the well 360. In certain instances, the fracturing fluid may comprise water, a hydrocarbon fluid, a polymer gel, foam, air, wet gases and/or other fluids.

The proppant source 340 can include a proppant for combination with the fracturing fluid. The system may also include additive source 370 that provides one or more additives (e.g., gelling agents, weighting agents, and/or other optional additives) to alter the properties of the fracturing fluid. For example, the other additives 370 can be included to reduce pumping friction, to reduce or eliminate the fluid's reaction to the geological formation in which the well is formed, to operate as surfactants, and/or to serve other functions.

The pump and blender system 350 receives the fracturing fluid and combines it with other components, including proppant from the proppant source 340 and/or additional fluid from the additives 370. The resulting mixture may be pumped down the well 360 under a pressure sufficient to create or enhance one or more fractures in a subterranean zone, for example, to stimulate production of fluids from the zone. Notably, in certain instances, the fracturing fluid producing apparatus 320, fluid source 330, and/or proppant source 340 may be equipped with one or more metering devices (not shown) to control the flow of fluids, proppants, and/or other compositions to the pumping and blender system 350. Such metering devices may permit the pumping, and blender system 350 can source from one, some or all of the different sources at a given time, and may facilitate the preparation of fracturing fluids in accordance with the present disclosure using continuous mixing or "on-the-fly" methods. Thus, for example, the pumping and blender system 350 can provide just fracturing fluid into the well at some times, just proppants at other times, and combinations of those components at yet other times.

Figure 4:
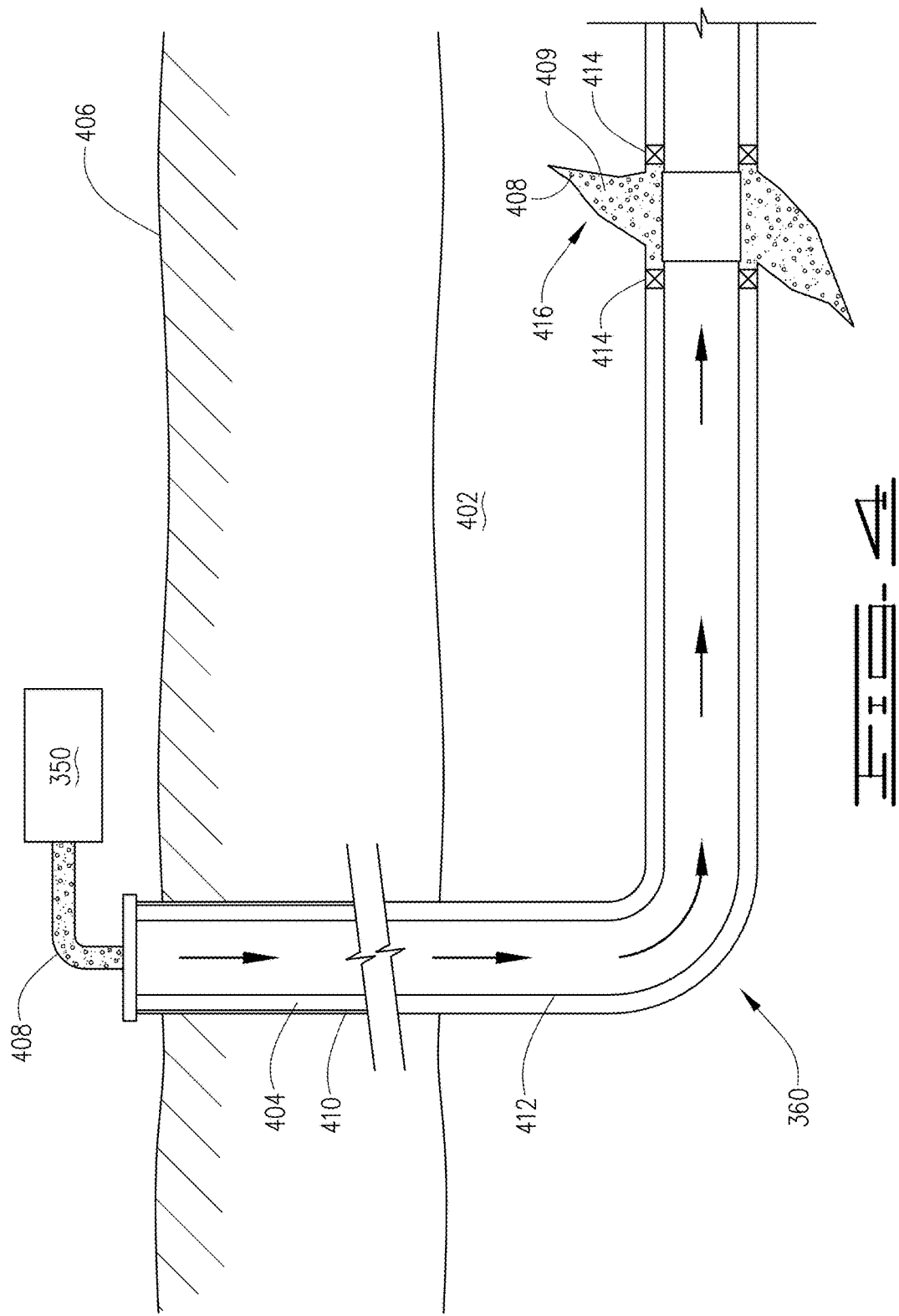
FIG. 4 is a diagram illustrating an example of a subterranean formation in which a fracturing operation may be performed in accordance with certain embodiments of the present disclosure.

FIG. 4 shows the well 360 during a fracturing operation in a portion of a subterranean formation of interest 402 surrounding a well bore 404. The well bore 404 extends from the surface 406, and the fracturing fluid 408 is applied to a portion of the subterranean formation 402 surrounding the horizontal portion of the well bore. Although shown as vertical deviating to horizontal, the well bore 404 may include horizontal, vertical, slant, curved, and other types of well bore geometries and orientations, and the fracturing treatment may be applied to a subterranean zone surrounding any portion of the well bore. The well bore 404 can include a casing 410 that is cemented or otherwise secured to the well bore wall. The well bore 404 can be uncased or include uncased sections. Perforations can be formed in the casing 410 to allow fracturing fluids and/or other materials to flow into the subterranean formation 402. In cased wells, perforations can be formed using shape charges, a perforating gun, hydro-jetting and/or other tools.

The well is shown with a work string 412 extending from the surface 406 into the well bore 404. The pump and blender system 350 is coupled a work string 412 to pump the fracturing fluid 408 into the well bore 404. The working string 412 may include coiled tubing, jointed pipe, and/or other structures that allow fluid to flow into the well bore 404. The working string 412 can include flow control devices, bypass valves, ports, and or other tools or well devices that control a flow of fluid from the interior of the working string 412 into the subterranean zone 402. For example, the working string 412 may include ports adjacent the well bore wall to communicate the fracturing fluid 408 directly into the subterranean formation 402, and/or the working string 412 may include ports that are spaced apart from the well bore wall to communicate the fracturing fluid 408 into an annulus in the well bore between the working string 412 and the well bore wall.

The working string 412 and/or the well bore 404 may include one or more sets of packers 414 that seal the annulus between the working string 412 and well bore 404 to define an interval of the well bore 404 into which the fracturing fluid 408 will be pumped. FIG. 4 shows two packers 414, one defining an uphole boundary of the interval and one defining the downhole end of the interval. When the fracturing fluid 408 is introduced into well bore 404 (e.g., in FIG. 4, the area of the well bore 404 between packers 414) at a sufficient hydraulic pressure, one or more fractures 416 may be created in the subterranean zone 402. The proppant particulates in the fracturing fluid 408 may enter the fractures 416 where they may remain after the fracturing fluid flows out of the well bore. These proppant particulates may "prop" fractures 416 such that fluids may flow more freely through the fractures 416.

While not specifically illustrated herein, the disclosed methods and compositions may also directly or indirectly affect any transport or delivery equipment used to convey the compositions to the fracturing system 310 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The following example is provided to illustrate the invention. The example is not intended and should not be taken to limit, modify or define the scope of the present invention in any manner.

Control 1

A dry-powder, natural polymer available from Halliburton Energy Services, Inc. in Houston, Tex. was used. The polymer was hydrated by adding 1000 ml of water at 40° F. (4.4° C.) to achieve a concentration of 80 pounds per thousand gallons water. After 1 minute, a Couette coaxial cylinder rotational viscometer was used to measure the viscosity. Subsequent viscosity readings were taken every two minutes. 100% hydration was reached at 15 minutes. The results are shown in FIG. 5.

Control 2

The same polymer as used for Control 1 was hydrated by adding 1000 ml of water at 100° F. (37.8° C.) to achieve a concentration of 80 pounds per thousand gallons of water. After 1 minute, a Couette coaxial cylinder rotational viscometer was used to measure the viscosity. Subsequent viscosity readings were taken every two minutes. 100% hydration was reached at 9 minutes. The results are shown in FIG. 5.

Example 1

The same polymer as used for Control 1 and Control 2 was hydrated by adding 200 ml of water at 100° F. (37.8° C.), After 45 seconds, an additional 800 ml of water at 40° F. (4.4° C.) was added. After 1 minute, a Couette coaxial cylinder rotational viscometer was used to measure the viscosity. Subsequent viscosity readings were taken every two minutes. 100% hydration was reached at 11 minutes. The amount of polymer used was sufficient to achieve a concentration of 80 pounds per thousand gallons of water after the addition of both the 200 ml and 800 ml of water. The results are shown in FIG. 5.

As can be seen from FIG. 5, hydration time of Example 1 was significantly reduced over Control 1 and approached the performance of Control 2 but only used ⅕ the energy to heat the initial wetting water. Accordingly, the current process allows for reducing the hydration to shorter periods and obtaining better polymer gelling reducing waste. Further, the current process can do so while using a fraction of the energy that has been traditionally necessary to heat the hydration fluid to achieve such results.

Examples of embodiments that are in accordance with the above description include a method for hydrating a hydratable material comprising the steps of:
  (a) generating a fluid flow between one or more inlets and an outlet, the fluid flow downstream of the inlets comprising first hydration-fluid stream at a first temperature and a second hydration-fluid stream at a second temperature and the fluid flow at the outlet comprising a flow of a well injection mixture;
  (b) elevating the temperature of the first hydration-fluid stream to a third temperature above the first temperature and above the second temperature;
  (c) combining the first hydration-fluid stream with a hydratable material to at least partially hydrate the hydratable material and form a hydration mixture, wherein the combining is at an elevated temperature above the first temperature and the second temperature; and
  (d) combining the hydration mixture with the second hydration-fluid stream to form the flow of the well injection mixture.

In the method, the hydration-fluid stream and the second hydration-fluid stream can be introduced through the inlets jointly as a flow of hydration fluid. Further, the method can comprises splitting the flow of hydration fluid downstream from the inlet and upstream from the outlet so as to form the first hydration-fluid stream and the second hydration-fluid stream.

Additionally in the method, the first hydration-fluid stream and second hydration-fluid stream can form a total hydration-fluid flow. The first hydration-fluid stream can be a minor portion of the total hydration-fluid flow and the second hydration-fluid stream can be a major portion the total hydration-fluid flow. The first hydration-fluid stream can be about 40% or less by volume of the total hydration-fluid flow and the second hydration-fluid stream can be about 60% or more by volume of the total hydration-fluid flow. Optionally, the first hydration-fluid stream can be about 30% or less by volume of the total hydration-fluid flow and the second hydration-fluid stream can be about 70% or more by volume of the total hydration-fluid flow.

In some embodiments, the hydration mixture is held for a predetermined period of time prior to being combined with the second hydration fluid in step (d) so as to prompt hydration of the hydratable material in the hydration mixture. In some embodiments, the method further comprises flowing the flow of well injection mixture through a hydration tank for a predetermined time period so as to prompt hydration of the hydratable material in the flow of well injection mixture.

The method can further comprises introducing the flow of well injection mixture from the outlet to a subsurface reservoir as part of a reservoir treatment process. The flow of well injection mixture can be introduced using a pump.

Other examples of embodiments include a hydration system comprising a flow of first hydration fluid, a flow of second hydration fluid, a heater, a first mixer, and a second mixer. The flow of first hydration fluid is at a first temperature. The flow of second hydration fluid is at a second temperature. The heater receives the flow of first hydration fluid and elevates the temperature of the flow of first hydration fluid to a third temperature greater than the first temperature and greater than the second temperature. The first mixer is operable to receive the flow of first hydration fluid from the heater and to combine the flow of first hydration fluid with a hydratable material to produce a flow of hydration mixture. The second mixer operable to receive the flow of second hydration fluid and the flow of hydration mixture and to combine the flow of second hydration fluid with the flow of hydration mixture to produce a flow of well injection mixture.

The hydration system can further comprise an inlet and a splitter. A flow of hydration fluid is introduced into the system through the inlet. The splitter receives the flow of hydration fluid and splits the flow of hydration fluid into the flow of first hydration fluid and the flow of second hydration fluid. Also, the hydration system can comprise a first flowmeter and a second flowmeter. The first flowmeter measures the total flow of the flow of hydration fluid introduced into the inlet. The second flowmeter measures the total flow of the first hydration fluid from the splitter.

Additionally, the hydration system can comprise a valve and a control module. The valve controls the flow of first hydration fluid from the splitter to the heater. The control module is operably connected to the first flowmeter, second flowmeter and valve so as to control the splitting of the hydration fluid such that the flow of first hydration fluid is a minor portion of the flow of hydration fluid and the flow of second hydration fluid is a major portion the flow of hydration fluid. The control module can control the splitting such that the flow of first hydration fluid is about 40% or less by volume of the flow of hydration fluid and the flow of second hydration fluid is about 60% or more by volume of the flow of hydration fluid. Optionally, the control module can control the splitting such that the flow of first hydration fluid is about 30% or less by volume of the flow of hydration fluid and the flow of second hydration fluid is about 70% or more by volume of the flow of hydration fluid.

In some embodiments the hydrating system can further comprises a holding tank. The holding tank receives the flow of hydration mixture from the first mixer and introduces it to the second mixer. The holding tank is operable to retain a portion of the flow of the hydration mixture for a predetermined period of time to prompt hydration of the hydratable material in the portion of the flow of hydration mixture. Some embodiments include a hydration tank. The hydration tank receives the flow of well injection mixture from the second mixer. The hydration tank is operable to retain a portion of the flow of the well injection mixture for a predetermined period of time to prompt hydration of the hydratable material in the portion of the flow of well injection mixture. Also, some embodiments comprise a pump. The pump receives the flow of well injection mixture from the hydration tank and introduces the flow of well injection mixture to a subsurface reservoir as part of a reservoir treatment process.

In some embodiments, the first temperature and the second temperature are about ambient temperature and the third temperature is at least about 50° F. greater than the first temperature and the second temperature.

Although the invention has been described with reference to a specific embodiment, the foregoing description is not intended to be construed in a limiting sense. Various modifications as well as alternative applications will be suggested to persons skilled in the art by the foregoing specification and illustrations. It is therefore contemplated that the appended claims will cover any such modifications, applications or embodiments as followed in the true scope of this invention.

What is claimed is:
1. A hydration system comprising:
  a flow of first hydration fluid at a first temperature;

a flow of second hydration fluid at a second temperature;

a heater which receives the flow of first hydration fluid and elevates the temperature of the flow of first hydration fluid to a third temperature greater than the first temperature and greater than the second temperature;

a first mixer operable to receive the flow of first hydration fluid from the heater and to combine the flow of first hydration fluid with a hydratable material to produce a flow of hydration mixture; and a second mixer operable to receive the flow of second hydration fluid and the flow of hydration mixture and to combine the flow of second hydration fluid with the flow of hydration mixture to produce a flow of well injection mixture.

2. The hydration system of claim 1, further comprising:
an inlet, wherein a flow of hydration fluid is introduced into the hydration system through the inlet; and
a splitter which receives the flow of hydration fluid and splits the flow of hydration fluid into the flow of first hydration fluid and the flow of second hydration fluid.

3. The hydration system of claim 2, further comprising:
a first flowmeter which measures the total flow of the flow of hydration fluid introduced into the inlet; and
a second flowmeter which measures the total flow of the first hydration fluid from the splitter.

4. The hydration system of claim 3, further comprising:
a valve which controls the flow of first hydration fluid from the splitter to the heater; and
a control module operably connected to the first flowmeter, second flowmeter and valve so as to control the splitting of the hydration fluid such that the flow of first hydration fluid is a minor portion of the flow of hydration fluid and the flow of second hydration fluid is a major portion of the flow of hydration fluid.

5. The hydration system of claim 4, wherein the flow of first hydration fluid is about 40% or less by volume of the flow of hydration fluid and the flow of second hydration fluid is about 60% or more by volume of the flow of hydration fluid.

6. The hydration system of claim 4, wherein the flow of first hydration fluid is about 30% or less by volume of the flow of hydration fluid and the flow of second hydration fluid is about 70% or more by volume of the flow of hydration fluid.

7. The hydration system of claim 4, further comprising:
a holding tank which receives the flow of hydration mixture from the first mixer and introduces it to the second mixer, the holding tank being operable to retain a portion of the flow of the hydration mixture for a predetermined period of time to prompt hydration of the hydratable material in the portion of the flow of hydration mixture.

8. The hydration system of claim 5, further comprising:
a hydration tank which receives the flow of well injection mixture from the second mixer, the hydration tank being operable to retain a portion of the flow of the well injection mixture for a predetermined period of time to prompt hydration of the hydratable material in the portion of the flow of well injection mixture.

9. The hydration system of claim 8, wherein the first temperature and the second temperature are about ambient temperature and the third temperature is at least about 50° F. greater than the first temperature and the second temperature.

10. The hydration system of claim 9, further comprising:
a pump which receives the flow of well injection mixture from the hydration tank and introduces the flow of well injection mixture to a subsurface reservoir as part of a reservoir treatment process.

* * * * *